US005327640A

United States Patent [19]

Janssen et al.

[11] Patent Number: 5,327,640

[45] Date of Patent: Jul. 12, 1994

[54] PRESS FOR ASSEMBLING AN ELECTRICAL CONNECTOR TO A PRINTED CIRCUIT BOARD

[75] Inventors: Joop Janssen, Hedel; Aart G. Ban Beem, Sleewijk; Theodorus J. Van Duin, Overasselt, all of Netherlands

[73] Assignee: The Whitaker Corporation, Wilmington, Del.

[21] Appl. No.: 959,019

[22] Filed: Oct. 9, 1992

[30] Foreign Application Priority Data

Oct. 31, 1991 [GB] United Kingdom ................ 9123138
Oct. 31, 1991 [GB] United Kingdom ................ 9123139

[51] Int. Cl.[5] .......................................... B23P 19/04

[52] U.S. Cl. .................................... 29/741; 29/759; 29/837; 29/842

[58] Field of Search ................ 29/739, 740, 741, 832, 29/837, 842, 845, 759, 760; 100/269 R, 270, 291, 292; 227/39, 41, 48, 49

[56] References Cited

U.S. PATENT DOCUMENTS

| | | | |
|---|---|---|---|
| 4,177,549 | 12/1979 | Mori et al. | 29/741 X |
| 4,205,433 | 6/1980 | Araki et al. | 29/837 |
| 4,327,484 | 5/1982 | Asai et al. | 29/739 X |
| 4,372,802 | 2/1983 | Harigone et al. | 29/740 X |
| 4,553,322 | 11/1985 | Cappos et al. | 29/739 |
| 4,590,673 | 5/1986 | Dornes et al. | 29/845 |

FOREIGN PATENT DOCUMENTS

| | | | |
|---|---|---|---|
| WO86/04460 | 7/1986 | European Pat. Off. . | |
| 209135 | 1/1987 | European Pat. Off. | 29/741 |

*Primary Examiner*—Peter Dungba Vo
*Attorney, Agent, or Firm*—Adrian J. LaRue; Eric J. Groen

[57] ABSTRACT

A press for assembling an electrical connector (C) having tines (T) projecting therefrom, to a printed circuit board (PCB), comprises a press ram (40) which is pivotally mounted to the top of the forward end of a press frame (16). A ram (40) has, at its forward end, a connector holder (54) for receiving a connector (C) with the tines (T) of the connector (C) projecting from the holder (54). A ram (40) has a raised, connector loading position, in which the connector holder (54) projects obliquely downwardly towards the operator so that the operator can easily load the connector (C), which may be of microminiature size, into the holder (54). The ram (40) has a drive unit (36) for driving it from its loading position into a vertical position, in which the holder (54) projects towards a printed circuit board (PCB) on a support structure (14). In this vertical position of the ram (40) an insertion drive unit (4) is actuated to cause a lever (6) to drive the ram (40) through a working stroke, so that the tines (T) of the connector (C) to the holder (54) are forced through holes in the circuit board (PCB) .

19 Claims, 8 Drawing Sheets

16
22
84
94
96
90
23
26
24
157
160
6
156
12
18
159
4
76
78
148
140
102
14
124
10
122
146
138
30
32
34
40
25
64
60
144
142
PCB
104
2
36
38
54
126
8
72
75
73
74
137
43
116
108
114
56
48
77
49
70
100
162
164
42
C
T

PRESS FOR ASSEMBLING AN ELECTRICAL CONNECTOR TO A PRINTED CIRCUIT BOARD

BACKGROUND OF THE INVENTION

1. Field of the Invention

This invention relates to a press for assembling an electrical connector having tines projecting therefrom, to a printed circuit board, by inserting the tines through holes in the circuit board.

2. Summary of the Prior Art

There is disclosed in U.S. Pat No. 4,590,673, a press for assembling an electrical connector having tines projecting therefrom to a printed circuit board, the press comprising a press frame, a press ram on the frame, means for supporting the circuit board beneath the ram, and means for driving the ram through a working stroke towards the circuit board to force the connector theretowards, thereby the force the tines of the connector through holes in the circuit board.

This known press is for use with connectors of substantial size, the circuit board supporting means comprising a slide which is moveable from a loading position outside the press frame to a working position beneath the press ram. The tines of the connector are inserted to a small extent into the holes in the circuit board, in the loading position of the slide. In the working position of the slide, the press ram drives the connector down towards the board so that the tines are forced through the holes therein. In this known press, the press ram is driven by a single high power piston and cylinder unit which is necessarily relatively bulky and expensive to produce. The present invention is intended to provide a press for force fitting a component into a work piece, that is compact and is economical to manufacture.

The press of the present invention, is intended for use with connectors of microminiature size and which are accordingly difficult to handle and wherein the press is compact and so takes up little space.

SUMMARY OF THE INVENTION

According to the present invention, a press as defined in the second paragraph of this specification is characterized in that the press ram has thereon a socket for receiving the connector with the tines thereof projecting from the socket and is mounted on the frame for movement between a connector loading first position in which the socket projects outwardly of the press and a second position in which the socket projects towards the circuit board when the circuit board is supported by the supporting means, the drive means entraining the ram when the ram is in its second position, to drive the ram through its working stroke and thereby to force the tines of the connector through the holes in the circuit board.

Since the socket projects outwardly of the press frame in the first position of the ram, the operator's task in inserting a connector into the socket, especially where the connector is of microminiature size is greatly assisted and the press requires no slide and support means which are external to the press frame for allowing the operator to load a connector into the press. Also, since the working stroke of the ram is short, because in the second position of the ram, the connector lies closely adjacent to the circuit board, it is substantially impossible for the operator to insert part of his body, for example a finger, between the tines of the connector and the circuit board, so as to be injured when the ram descends.

Conveniently, the ram is pivotally connected to the frame of the press for movement between the first and second positions of the ram, the socket on the ram projecting obliquely downwardly towards the operator in the first position of the ram.

Further to assist the operator, the ram may be provided with a drive unit for moving the ram automatically, between its first and second positions, so that all the operator need do is to load a connector into the socket on the ram and then start the press. Means are preferably provided for ensuring that the operator cannot start the press until after he has loaded the connector into the socket. In the interest of compact construction, the said drive means entraining the ram may be a short stroke piston and cylinder unit housed within the press frame and driving a lever having a tip for entraining the press ram to drive it through its working stroke.

According to another aspect of the invention a press as defined in the second paragraph of this specification is characterized in that the ram drive means comprises a low power first piston and cylinder unit for driving the ram from the first position thereof to an intermediate second position substantially nearer to the work piece than said first position and a high power second position and cylinder unit having a shorter stroke than the first piston and cylinder unit and being drivingly connected to means for entraining the ram when the ram is in its second position, to drive the ram further towards the work piece to force fit the component thereinto.

The second piston and cylinder unit can be of small height so that it need only be supported by a top wall of the press frame with its piston rod located a short distance above the work piece in a retracted position of the piston rod.

The entraining means preferably comprises a lever which is driven by the piston rod of the second piston and cylinder unit so as to afford considerable mechanical advantage in the driving of the ram by the second piston and cylinder unit.

The lever may be pivotally supported at one end by the frame, at a position remote from the second piston and cylinder unit, the other end of the lever engaging in a recess in the ram in the second position thereof, the piston rod of the second piston and cylinder unit being connected to the lever at a position intermediate its ends.

Conveniently, the first piston and cylinder unit is moveable with the ram between the first and second positions thereof and is arranged to drive the ram axially, so that cam follower means on the ram cooperate with a cam track on the frame, to guide the ram between its first and its second positions.

The leading end of the ram may be provided with a holder for the component, the ram extending obliquely, in its first position, to enable an operator to insert the component into the holder, the ram extending vertically when in its second position.

The frame may be a simple box like structure, the ram and the first piston and cylinder unit being pivotally mounted to the forward end of the top wall of the frame, externally thereof, and the second piston and cylinder unit being secured to the underside of said top wall, beneath the first piston and cylinder unit.

BRIEF DESCRIPTION THE DRAWINGS

DETAILED DESCRIPTION OF THE PREFERRED EMBODIMENT

Figure 3:
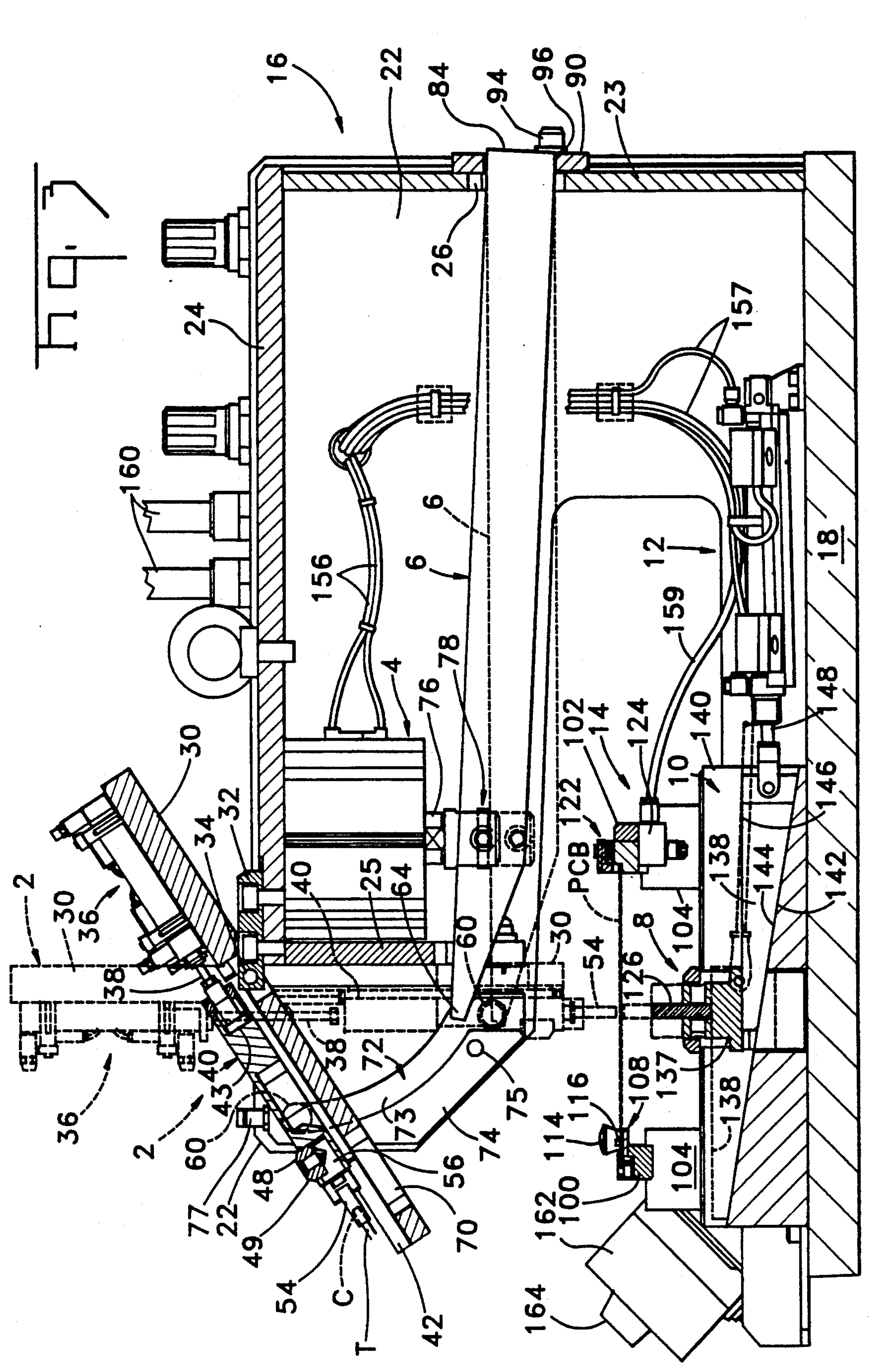
FIG. 3 is a longitudinal sectional view of the press showing the ram assembly in a raised angular position.
Figure 6:
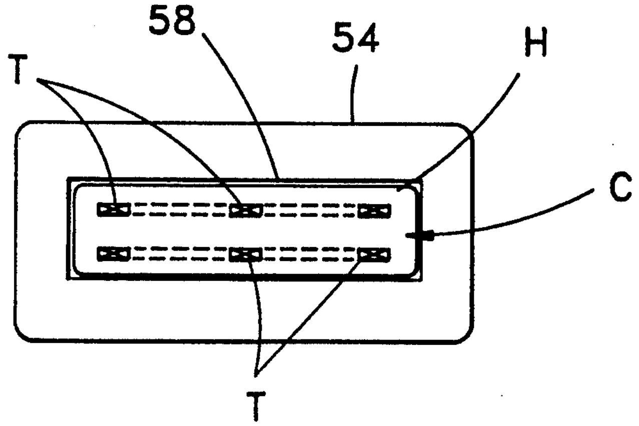
FIG. 6 is an enlarged front end view of a connector holder of the ram assembly showing a connector in the holder.
Figure 7:
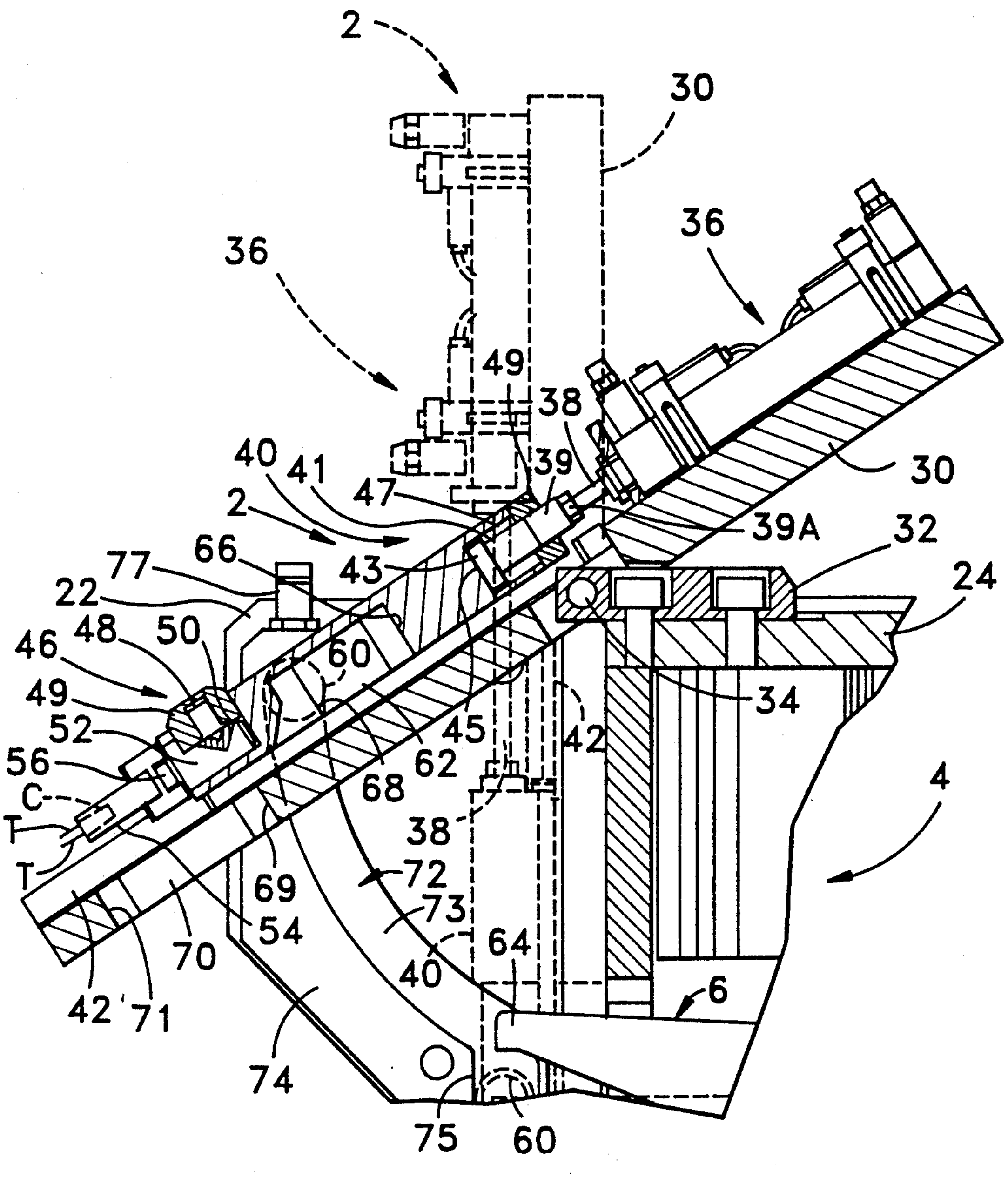
FIGS. 7, 8, and 9 are enlarged fragmentary views illustrating further details of FIG. 3.
Figure 9:
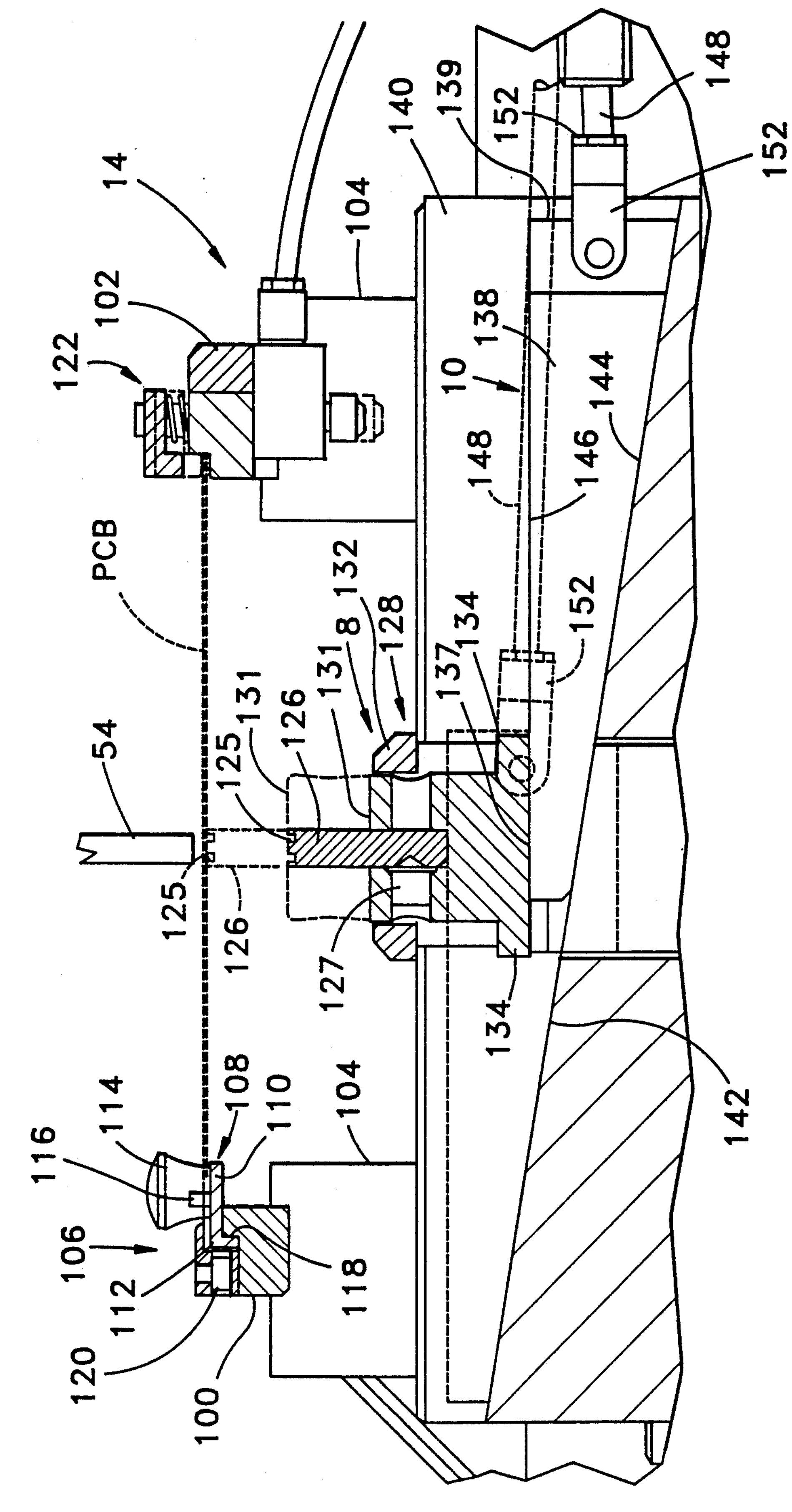

The press is for assembling electrical connectors C to a printed circuit board PCB which is shown in broken lines in FIGS. 3 and 9. As shown in FIGS. 3, 6 and 7 a connector C comprises an elongate insulating housing H containing electrical terminals having solder tines T projecting in rows from the bottom of the housing H for force fitting insertion into respective holes in the board PCB. The press is constructed so as especially to be suitable for use with connectors C which are of micro-miniature size and so are difficult to handle and to locate for assembly to a printed circuit board. Since the force needed to insert the tines of such a connector through holes in a printed circuit board, corresponds to a multiple of a number of tines to be inserted, the press must be capable of generating a substantial insertion force in order to drive the tines into the holes in the board. As will appear from the following description, the insertion force is generated by a compact, short stroke, piston and cylinder unit of the necessary power and the connector is transported from a position in which it can be easily located in the press by an operator, by means of a low power piston and cylinder unit.

The upper tooling of the press comprises a pivotable ram assembly 2, a double acting, insertion piston and cylinder unit 4 and a ram drive lever 6 associated therewith, the lower tooling of the press comprising a printed circuit board back up assembly 8, a back up plate drive assembly 10 and a drive piston and cylinder unit 12 associated therewith. The piston and cylinder units 4 and 12 are pneumatic. Associated with the lower tooling, is a printed circuit board support and indexing assembly 14. The press has a generally rectangular press frame 16 supporting the said units and assemblies, the frame 16 comprising a base plate 18, side walls 20 and 22, respectively, and a rear wall 23 upstanding from the base plate 18, said side and rear walls being spanned by a top wall 24 from which depends a front wall 25. An electronic control box 26 containing programmable circuitry for controlling the operation of the press, is secured to the outer side of the side wall 20, a pneumatic valve assembly 28 for controlling the piston and cylinder units, under the control of the control circuitry, being secured to the side wall 22.

Figure 1:
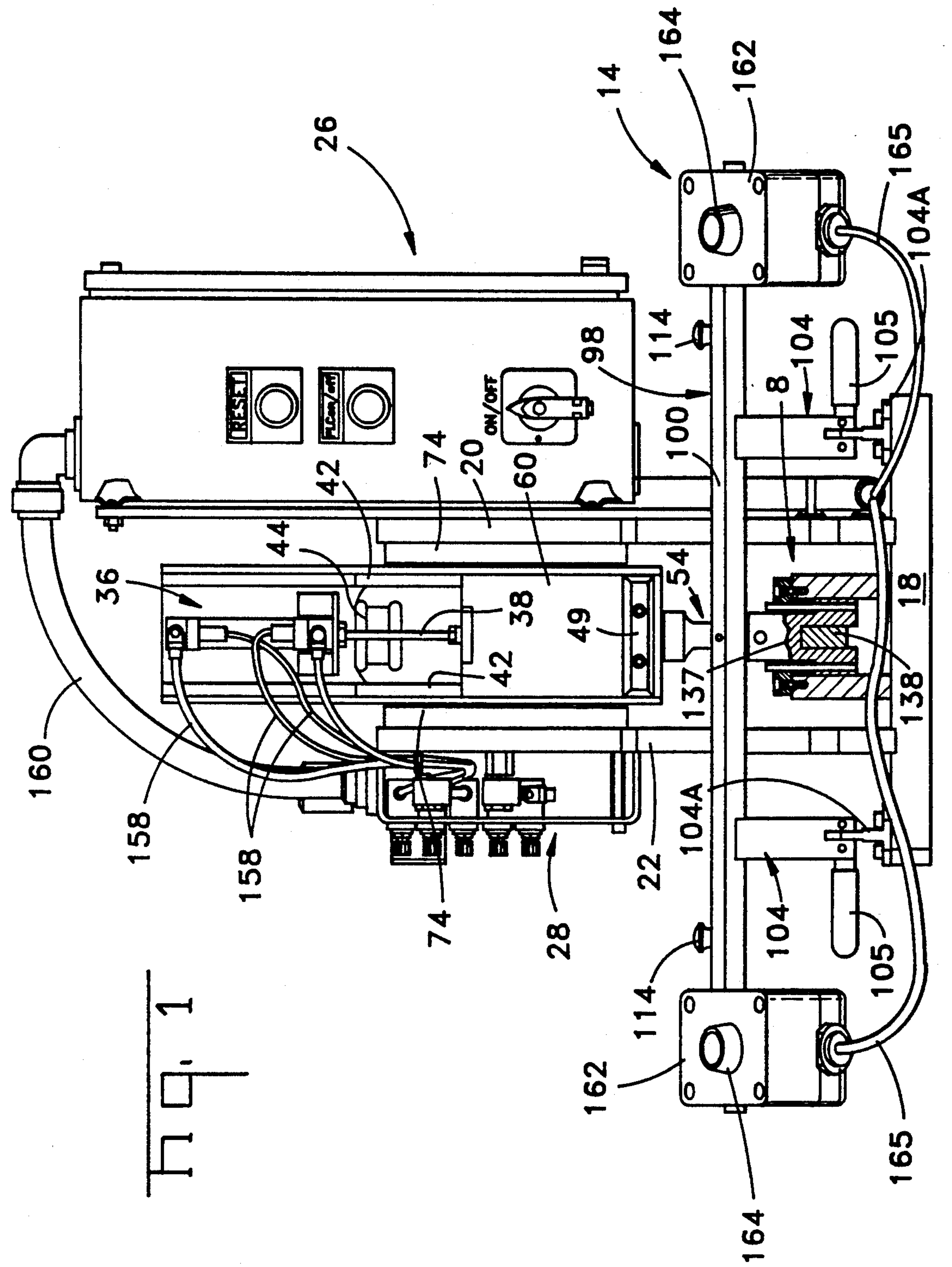
FIG. 1 is a front view, shown partly in section, of a press for assembling electrical connectors to a printed circuit board and showing a pivotable ram assembly of the press in a vertical, lowered position.

The ram assembly 2, which is best seen in FIG. 7, comprises an elongate plate 30, pivotally connected between its ends to a support plate 32, by means of pivot pin 34, the plate 32 being screwed to the outer side of the forward end of the top wall 24. A double acting, pneumatic, drive piston and cylinder unit 36 fixed to the plate 30 rearwardly of the pivot pin 34, has a piston rod 38 which is axially adjustably secured by way of a screw connection 39 and a nut 39A to a press ram 40 which is slideable along the plate 30 on gibs 42 fixed thereto. A return compression spring 41, surrounding the piston rod 38 is interposed between the piston rod 38 and the ram 40, a head 43 on the rod 39 engaging an abutment face 45 in a recess 47 in the rear end of the ram 40. The spring 41 acts between the head 43 and a cap 49 closing the rear end of the recess 47. The forward end of the ram 40 is formed with a tool holder 46, comprising a spring loaded, retention ball catch 48 carried by a support plate 49 and projecting into an opening 50 in the forward end of the ram 40. The opening 50 receives the shank 52 of a tool in the form of an elongate connector holder 54 which is connected to the shank 52 by means of a screw 56. As shown in more detail in FIG. 6, the holder 54 has a socket 58 opening into its forward end, for snugly receiving a connector C. The shank 52 is withdrawable from the opening 50, against the action of the ball catch 48 in order to allow the connector holder 54 to be exchanged, where a differently dimensioned connector C is to be assembled to the board PCB. Rearwardly of the opening 50, the ram 40 has on each side thereof, a cam follower roller 60, one of which is shown in broken lines in FIGS. 3, 7 and 8. Also rearwardly of the opening 50, the ram 40 is formed with a recess 62 opening into its underside facing the plate 30, for receiving the tip 64 of the ram drive lever 6, as will further be explained below. The recess 62 has a rear end face 66 and a forward end face 68. The plate 30 has a through slot 70 near its forward end, for alignment with the recess 62 in an advanced axial position of the ram 40 as will further be described below. The slot 70 is substantially longer in the longitudinal direction of the plate 30, than the recess 62. The slot 70 has a rear end face 69 and a forward end face 71. Each roller 60 engages in a cam groove 72 in a respective plate 74, one of which is fixed to the inner face of the side wall 20 and the other of which is fixed to the inner face of the side wall 22, as best seen in FIG. 1. The groove 72 has an arcuate, generally parabolic, upper portion 73 and a shorter, vertical rectilinear bottom portion 75. The piston and cylinder unit 36 is actuable to slide the ram 40 between the retracted position in which it is shown in FIGS. 3 and 7, to an advanced, forward position in which the face 66 of the recess 62 is aligned with the end face 69 of the slot 70. As the piston rod 38 is extended to advance the ram 40, the cam follower rollers 60 travel down the arcuate portions 73 of the grooves 72 to lie in the upper parts of the bottom portions 75 of the grooves 72. As the rollers 60 travel down said portions 73, the ram assembly 2 is pivoted about the pin 34 from the raised, connector loading position in which it is shown in full lines in FIGS. 3 and 7, to a vertical position in which it is shown in a chain dot lines in those Figures, by virtue of the action of the rollers 60 against the walls of the cam groove portions 73. During this rotary movement of the ram assembly 2, at the end of which movement the ram assembly 2 engages a shock absorber 77, the tip 64 of the lever 6 passes through the slot 70 in the plate 30 and into the recess 62 in the ram 40 to lie adjacent to the forward end face 68 of the recess 62 in the vertical angular position of the ram assembly 2.

Figure 8:
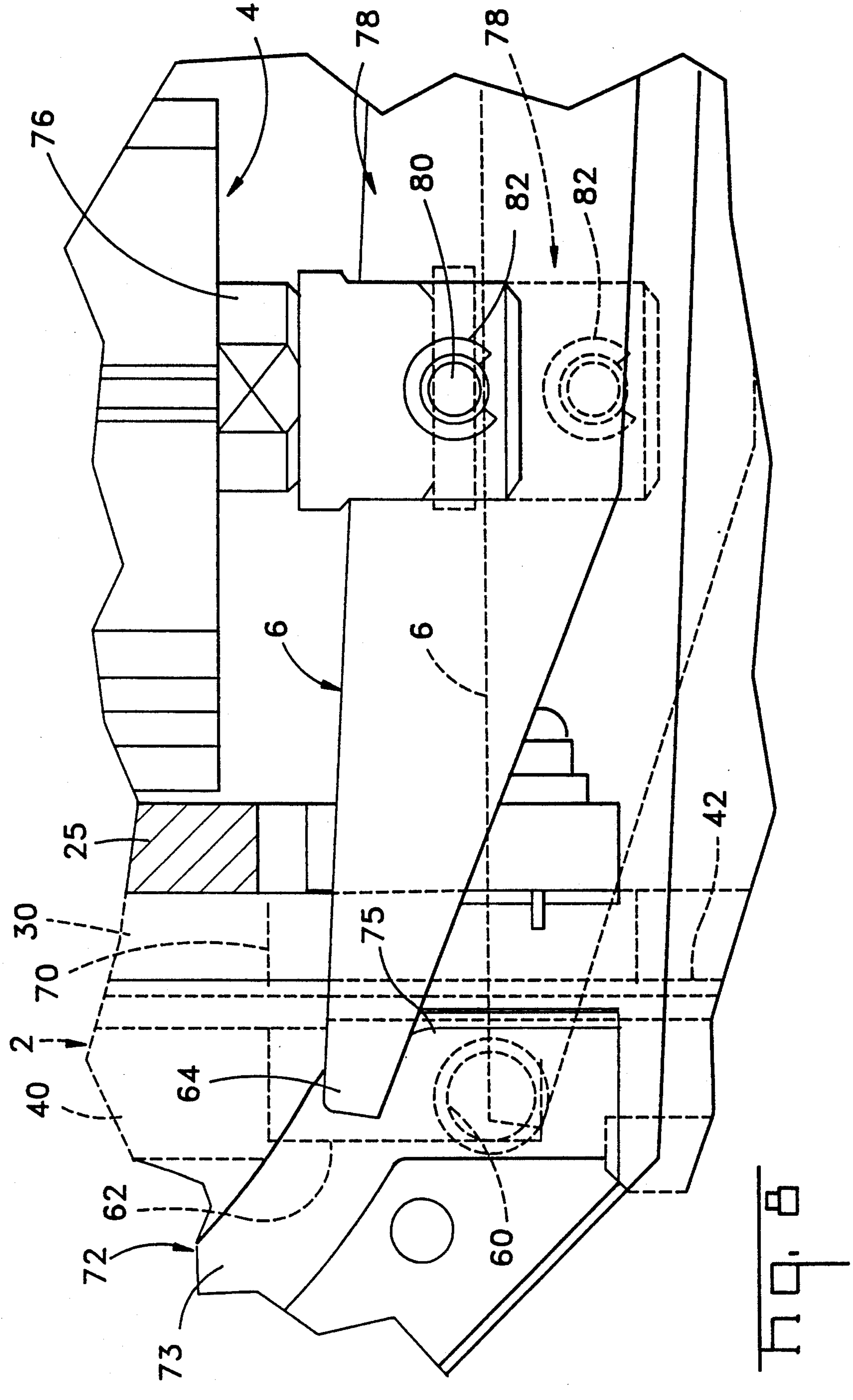

The insertion piston and cylinder unit 4, which is secured to the underside of the top plate 24 of the frame 16 and which is a short stroke piston and cylinder unit capable of generating an insertion force of 500 kilograms for example, has a piston rod 76 to which is fixed a U-shaped saddle 78 embracing the lever 6 and being connected thereto by a grooved pin 80, as best seen in FIG. 8, on which fit retaining rings 82, the connection allowing limited pivotal movement of the lever 6 relative to the saddle 78. The piston rod 76 of the unit 4 is advanceable thereby through a working, or insertion, stroke to depress the saddle 78 from a retracted position, in which it is shown in full lines in FIGS. 3 and 8 to an advanced, insertion position, in which the saddle 78 is shown in broken lines in FIGS. 3 and 8.

Figure 5:
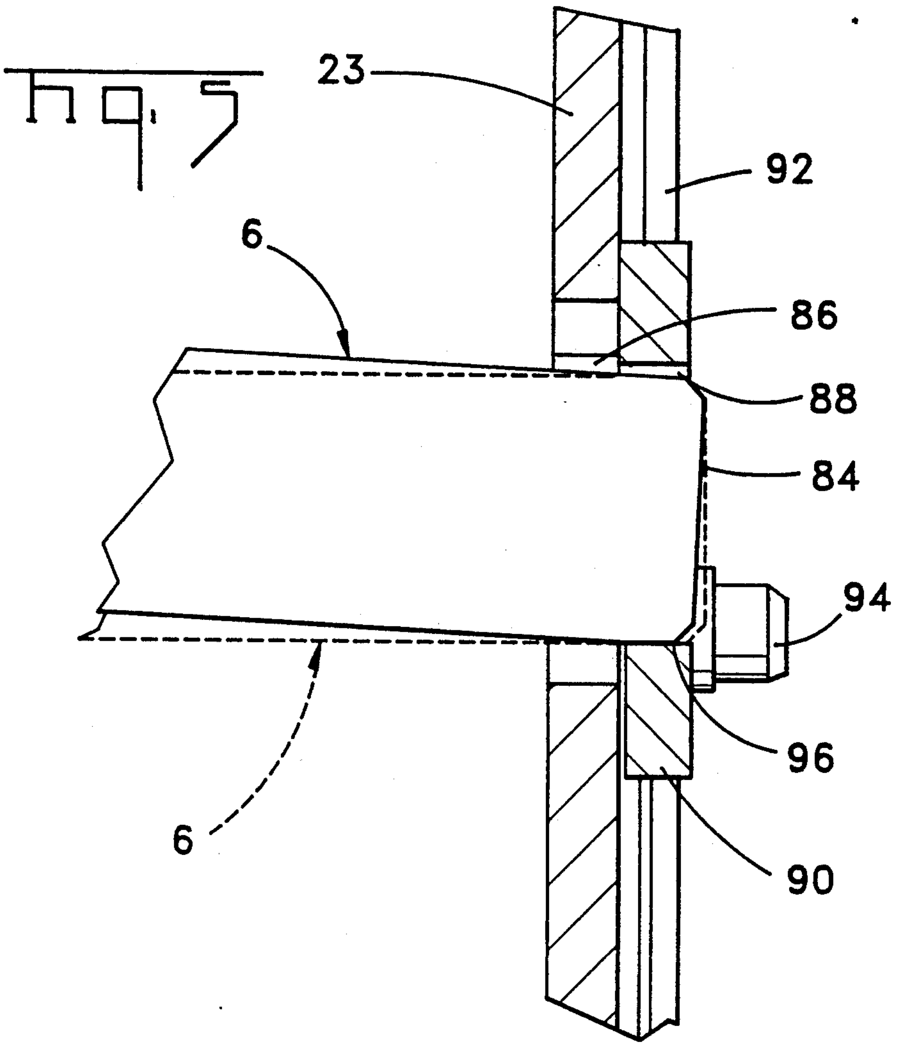
FIG. 5 is an enlarged fragmentary view illustrating details of FIG. 3.

The lever 6, which is supported intermediate its ends, by the saddle 78, has its rear end 84 extending, with clearance, through an opening 86 in the rear wall 23 of the press frame 16, and through an opening 88 in an adjustment plate 90 which is slideable along a vertical slideway 92 on the wall 23 and which can be fixed in position therealong by means of screws 94. The plate 90 is best shown in FIG. 5. The end 84 of the lever 6 which extends through the opening 88 with a slight clearance, rests on the lower edge 96 of the opening 88, providing a fulcrum about which the lever 6 can pivot between the full and broken line positions of the lever 6, shown in FIGS. 3, 5 and 8, as the piston rod 76 is driven between its retracted and its advanced positions. When the piston rod 76 is advanced by the piston and cylinder unit 4, through its working stroke, the ram assembly 2 being in its vertical position as described above, the tip 64 of the lever 6 is driven against the forward face 68 of the recess 62 in the ram 40, so that the ram 40, thereby entrained by the lever 6, is driven further along the gibs 42 through an insertion stroke against the action of the return spring 41, until the rollers 60 are driven down to the lower part of the vertical portions 75 of the cam grooves 72, as indicated in broken lines in FIGS. 3 and 8 so that the tool holder 54 is also driven through an insertion stroke, that is to say a working stroke.

The printed circuit board indexing and support assembly 14 comprises a printed circuit board support 98 provided by forward and rearward printed circuit board tracks 100 and 102, respectively, mounted to the base plate 18 by means of supports 104 horizontally slideable over T-rails 104A and being fixable by means of handles 105, best seen in FIG. 1. The forward track 100 comprises a printed circuit board indexing device 106 having an L-cross section plate 108 extending longitudinally of the track 100. The plate 108 has, as best seen in FIG. 9, in cross section, a horizontal arm 110 and a vertical arm 112. The arm 110 has thereon, indexing handles 114, and dowels 116 for insertion in holes in the board PCB to locate it in the said tracks. The vertical arm 112 extends into a complementary cross section notch 118 in the track 100 and is formed with a row of indexing dimples (not shown) extending longitudinally of the plate 108, for successive engagement by an exchangeable spring loaded, ball catch 120 in the track 100. The track 102 is provided with a releasable clamp 122 which is moveable by a piston and cylinder unit 124, between a printed circuit board release position, shown in full lines in FIGS. 3 and 9 and a printed circuit board clamping position shown in broken lines in those Figures. The said dimples, are relatively spaced in accordance with a connector assembly programme, the handles 114 being moveable by the operator lengthwise of the tracks, to index the board PCB therealong in accordance with the programme. However, the assembly 14 could be replaced by a manual, or an electronically programmable, X-Y table (not shown).

Figure 4:
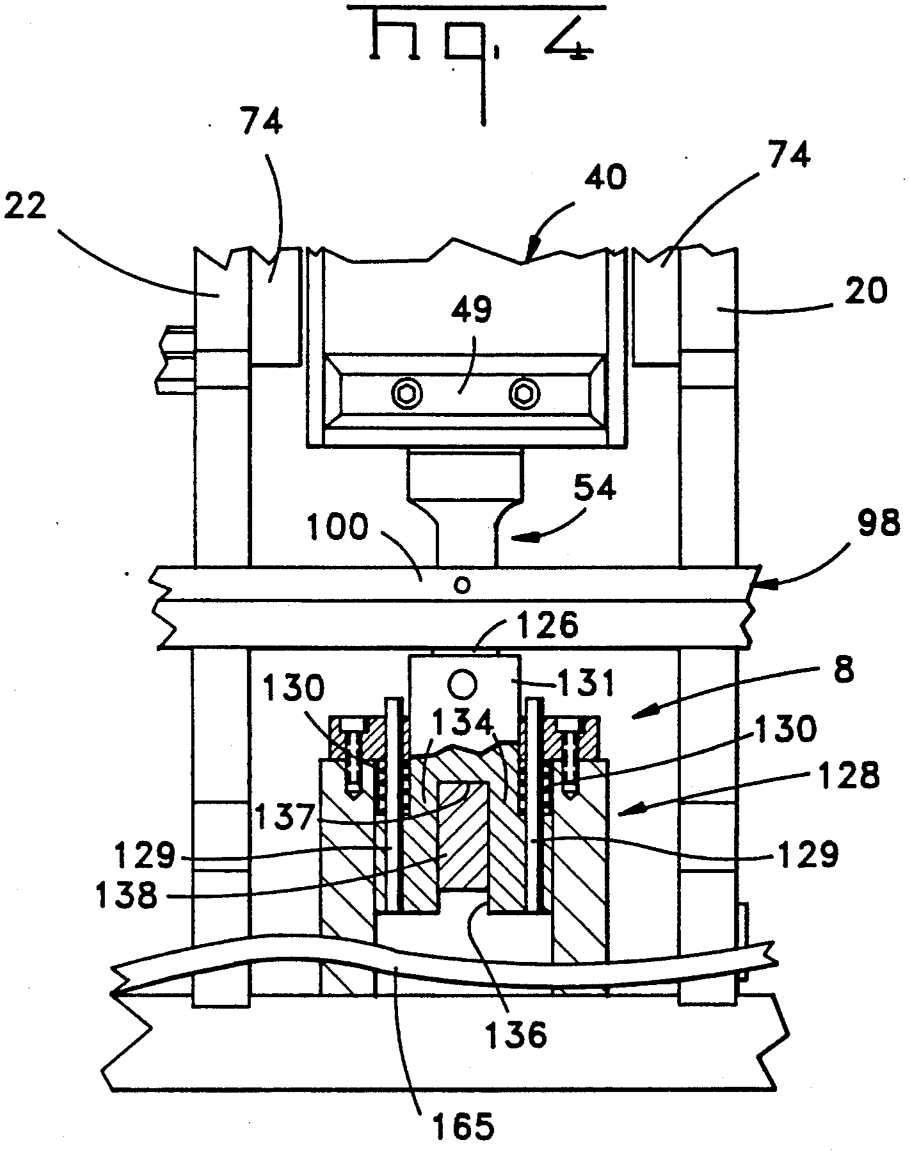
FIG. 4 is an enlarged fragmentary view illustrating details of FIG. 1.

The printed circuit board back up assembly 8 comprises, as best seen in FIGS. 3, 4 and 9, a back up plate 126 having an upper working end formed with connector tine receiving notches 125, for supporting the board PCB during each insertion operation. The plate 126 is exchangeably mounted, by means of a spring loaded ball catch 127, in a slide 131 in a housing 128. The slide 131 is slideable vertically in the housing 140 and is urged into a downward retracted position by return springs 130 on rods 129, acting between a cap 132 on the housing 140 and shoulders 134 on the slide 131. The slide 131 has a slot 136 opening into its bottom end, having a base 137.

Figure 2:
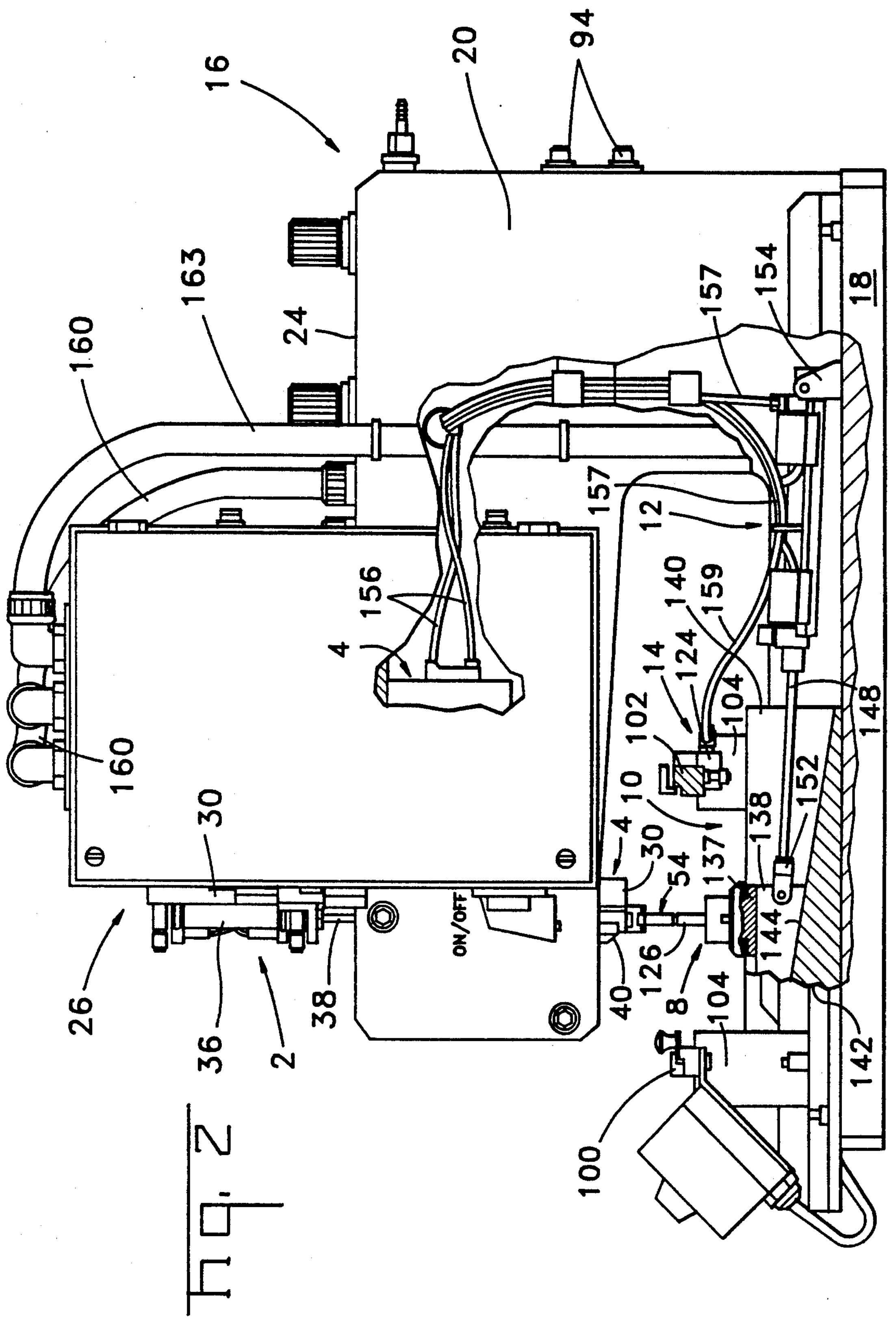
FIG. 2 is a side view, shown partly in section, of the press, showing the ram assembly in its vertical position.

The back up plate drive wedge assembly 10 comprises a drive wedge 138 which is longitudinally slideable in a housing 140 on the base plate 18, having a leftwardly (as seen in FIGS. 2, 3 and 9), upwardly inclined base 142 along which a similarly inclined surface 144 of the wedge 138 is slideable with a horizontal top surface 146 of the wedge 138 engaging against the base 137 of the slot 136. The larger end 139 of the wedge 138 is pivotally connected to the piston rod 148 of the drive unit 12, by way of a clevis 150 with a screw connection 152 for adjusting the effective length of the piston rod 148. The unit 12 is pivoted to the base plate 18 in a clevis 154. The unit 12 drives the wedge 138 between a retracted position as shown in full lines in FIGS. 3 and 9 and an advanced position shown in broken lines in those Figures. The wedge 138 is shown only in its advanced position in FIGS. 1, 2 and 4.

In the retracted position of the wedge 138, the slide 131 and thus the back up plate 126 are in a lowered position shown in full lines in FIGS. 3 and 9, under the action of the return springs 130. As the unit 12 advances the wedge 138, the wedge 138 drives the slide 131 up to a fully raised position which is shown in broken lines in FIGS. 3 and 9 and in full lines in FIGS. 1, 2 and 4, in which position, the upper working end of the plate 126 supports the board PCB against the tine insertion forces.

The cylinders of the piston and cylinder units 4, 12, 36 and 124 are connected to the control valve assembly 28, by way of air lines 156 to 159, respectively, as will appear from FIGS. 1 to 5. The valves of the assembly 28 are in turn controlled by control circuitry of the electronic control box 26 to which the valves are connected by cables 160. The box 26 has a supply cable 163. The positions of the moving parts of the press are communicated to the control circuitry by switches on the piston and cylinder units 4, 12 and 36 for comparison with the programme stored in the control circuitry. As shown in FIG. 1, the control box 26 has a reset button which is actuable to return the parts of the press to their starting positions in the event of faulty operation of the press or malfunction thereof. The control box 26 also has a PLC (programme logic circuit) on/off button for actuating and de-actuating the control circuitry, and an on/off switch for the power supply to the press. Adjacent to the printed circuit board track 100, and positioned at each end thereof, as shown in FIG. 1, is a start push button assembly 162 connected to the control circuitry by lines 165 and having an illuminable start push button 164, for sequentially actuating a ram assembly 2 and the piston and cylinder unit 4. In order to actuate these assemblies, the operator initially presses both the left hand, in FIG. 1, button 164 and the right hand button 164 shortly after each other, for example 50 milliseconds. If the press is ready for operation, the control circuitry illuminates the left hand button 164.

The starting positions of the parts of the press are as follows:

The ram assembly 2 is in the raised angular position in which it is shown in full lines in FIGS. 3 to 7, the assembly 2 extending at an angle of approximately 50 degrees with respect to the vertical, so that the socket 58 of the connector holder 54 projects outwardly of the press and obliquely downwardly towards the operator.

The piston rod 76 of the unit 4 is in its retracted, raised position, as shown in full lines in FIGS. 3 to 8.

The clamp 122 is in its printed circuit board release position shown in full lines in FIGS. 3 and 9.

The piston rod 148 of the backup plate drive assembly 10 is in its retracted, lowered, position as shown in full lines in FIGS. 3 and 9.

Before starting the press, the operator switches on the power supply and the control circuitry and indexes the board PCB to the position required for the connector assembly programme to be carried out, by means of the handles 114. The operator then inserts a connector C into the socket 58 of the connector holder 54 with the tines T of the connector C projecting therefrom, as best seen in FIG. 7. The operator then presses the start buttons 164 to start the press, in the manner described above, whereby the piston and cylinder unit 36 is actuated by the control circuitry to advance its piston rod 38 to drive the ram assembly 2 to its vertical position and the piston and cylinder unit 12 is actuated to drive the back up plate 126 to is fully raised printed circuit board clamping position. Upon the ram assembly 2 reaching its vertical position, the control circuitry illuminates both push buttons 164 and after the operator has again pressed both of the push buttons 164, as described above, the control circuitry actuates the piston and cylinder units 4 and 124 to advance their respective piston rods so that the ram 40 is driven through its working stroke by the piston rod 76 and the lever 6, to insert the tines T of the connector C into their respective holes in the board PCB, the board being simultaneously clamped by the clamp 122 as indicated in broken lines in FIGS. 3 and 9. The control circuitry then returns the units 4, 12, 36 and 124 to their starting positions ready for a further cycle of operation of the press.

By virtue of the location of the connector holder 54 in the starting position of the press, the operator's task in loading the connector C into the socket 58 is greatly assisted, especially where the connector is of microminiature size.

Since both of the start buttons 164 must be pressed in quick succession in order to cause the ram assembly 2 to be moved from its initial raised position, the assembly 2 cannot move so as to injure the operator whilst he is placing the connector C in the socket 58. Also, in since the vertical position of the assembly 2, the connector C in the socket 58 lies closely proximate to the board PCB, it is substantially impossible for the operator to insert his finger between the connector and the board.

Since little energy is needed to transfer the assembly 2 from its raised to its vertical position, the piston and cylinder unit 36 is of low power, the high power piston and cylinder unit 4 which provides the insertion force, having a short working stroke and thus being relatively small and compact and readily accommodated within the press frame 16. The mechanical advantage of the lever 6, which rotates about its end 84, whilst the force of the piston rod 76 is applied proximate to the tip 64, is great.

We claim:

1. A press for assembling an electrical connector having tines projecting therefrom, to a printed circuit board, the press comprising a press frame, a press ram, a back-up assembly on the frame for supporting the circuit board positioned beneath the press ram, and a driving member for driving the ram carrying a connector thereon through a working stroke towards the circuit board to force the connector theretowards, thereby forcing the tines of the connector into through-holes provided in the circuit board; the press ram having thereon a socket for receiving the connector, with the tines thereof projecting from the socket said press ram slidably mounted for sliding movement by the driving member through a working stroke of said press ram along a ram support, said ram support pivotally mounted on the frame, said press ram further comprising a cam follower which follows a cam track provided on said frame during pivoting of said ram support while said ram support moving between a connector loading first position in which the socket projects outwardly of the press, and a second position in which the socket projects towards the circuit board when the circuit board is supported by the back-up assembly, the driving member entraining the ram when the ram is in the second position, to drive the ram through the working stroke.

2. The press as claimed in claim 1, wherein the socket projects obliquely downwardly and away from the frame, in said first position of the press ram, and the press ram extends vertically in the second position thereof.

3. The press as claimed in claim 1, wherein the driving member has a projection for engaging the ram in the second position thereof, to drive the ram through the working stroke against the action of return means.

4. The press as claimed in claim 3, wherein the driving member on the ram support has a piston rod connected to the ram by way of said return means, for driving the ram along the ram support, to cause the cam follower means to follow the cam track so that the ram is moved from the first to the second position.

5. The press as claimed in claim 4, wherein the cam track has an arcuate portion for guiding the ram from the first to the second position, and a rectilinear portion adjoining said arcuate portion, for guiding the ram through the working stroke while the ram is entrained by the drive member.

6. The press as claimed in claim 5, wherein the ram support is pivotally attached to the frame at a pivot point intermediate the ends of the ram support, the socket projecting from a forward end of the ram, the ram being positioned forwardly of the pivot point, and the drive unit being positioned rearwardly thereof, the return means comprising a compression spring acting between the piston rod and the ram.

7. The press as claimed in claim 1, wherein the driving member comprises a lever having at one end, a tip for engaging an abutment on the ram in the second position thereof, the opposite end of the lever having a fulcrum on the press frame, the driving member having a piston rod connected to the lever towards the tip thereof, and which drives the ram through its working stroke, upon actuation of the driving member.

8. The press as claimed in claim 7, wherein said opposite end of the lever rests on an edge of a plate of the frame remote from said tip, thereby providing said fulcrum, said plate being vertically adjustable.

9. The press as claimed in claim 7, wherein the piston rod of the driving member is connected to the lever by means of a saddle embracing the lever, and being secured to the lever to allow limited vertical pivotal movement thereof.

10. The press as claimed in claim 1, further comprising a housing on a base plate of the press frame a slide which is vertically slideable in the housing, and a printed circuit board support plate extending vertically from the slide and being located in alignment with the socket in said second position on the ram, the slide having drive means actuable to raise the slide to advance the support plate to a board supporting position, in the second position of the ram.

11. The press as claimed in claim 1, further comprising first and second start switches which are widely spaced from one another on opposite sides of the press, said start switches being actuable to start the press only when both of said start switches are actuated substantially simultaneously.

12. A press for force fitting a component into a workpiece, the press comprising a press frame, means for supporting the workpiece, a press ram mounted on the frame for movement towards and away from the workpiece when it is mounted on the supporting means, and a drive unit for driving the ram having a component thereon from a first position remote from the workpiece, towards the workpiece to force fit the component thereinto; the ram drive unit comprises a low power first piston and cylinder unit for driving the ram from a first position thereof to an intermediate second position located substantially nearer to the workpiece than said first position, the press further comprising a high power second piston and cylinder unit having a shorter stroke than the first piston and cylinder unit and being drivingly connected to means for entraining the ram when the ram is in the second position to drive the ram having a component thereon further towards the workpiece to force fit the component thereinto a lever having two ends, one of said ends of said lever being pivotally supported on said frame while the other end of said lever being adapted to entrain said ram, said ram having an abutment thereon and said other end of said lever drivingly engaging with said abutment of said ram.

13. The press as claimed in claim 12, wherein one end of the lever is pivotally supported on the frame, the other end of the lever being engageable with said abutment, the piston rod of the second piston and cylinder unit being connected to the lever intermediate the ends thereof.

14. The press as claimed in claim 12, wherein the piston rod of the second piston and cylinder unit is connected to the lever by means of a connecting element secured to the lever to allow limited pivotal movement thereof with respect to the connected element, said one end of the lever resting on a support which is adjustable on the frame to adjust the angular position of the lever with respect to the connecting element.

15. The press as claimed in claim 13, wherein the other end of the lever has a tip which is engageable in a recess in the ram, as the ram reaches its second position, an end of the recess constituting the abutment.

16. The press as claimed in claim 12, wherein the ram is pivotally attached to the frame for movement between said first and second positions, the ram extending perpendicularly with respect to the workpiece in the second position of the ram.

17. The press as claimed in claim 16, wherein the ram is pivotally attached to the frame by way of a support plate on which the first piston and cylinder unit is mounted, the ram being driveably along the support plate by the first piston and cylinder unit.

18. The press as claimed in claim 12, wherein the ram is connected to the frame by way of a cam follower on the ram, which engages in a cam groove in the frame to guide the ram between its first and second positions.

19. The press as claimed in claim 12, wherein the piston rod of the first piston and cylinder unit is connected to the ram by way of a return compression spring which is compressed by relative movement between the ram and the piston rod of the first piston and cylinder unit as the ram is being driven by the second piston and cylinder unit.

* * * * *